(12) United States Patent
Kelley et al.

(10) Patent No.: US 12,056,557 B2
(45) Date of Patent: Aug. 6, 2024

(54) CARD READER WITH ENHANCED TAMPER RESISTANCE

(71) Applicant: Diebold Nixdorf, Incorporated, Hudson, OH (US)

(72) Inventors: Ryan Kelley, Canton, OH (US); Karl Meves, Brunswick, OH (US); Pedro Tula, Hudson, OH (US); Marcelo Castro, Canton, OH (US); Shawn Griggy, North Canton, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 18/098,750

(22) Filed: Jan. 19, 2023

(65) Prior Publication Data

US 2023/0259721 A1  Aug. 17, 2023

Related U.S. Application Data

(60) Provisional application No. 63/309,828, filed on Feb. 14, 2022.

(51) Int. Cl.
*G06K 7/00* (2006.01)

(52) U.S. Cl.
CPC ................................ *G06K 7/0021* (2013.01)

(58) Field of Classification Search
CPC .................................................. G06K 7/0021
See application file for complete search history.

(56) References Cited

U.S. PATENT DOCUMENTS

| 5,537,938 | A | 7/1996 | Lopez, Jr. |
| 5,973,799 | A | 10/1999 | Gatto et al. |
| 7,147,152 | B2 | 12/2006 | Yoshioka et al. |
| 8,418,917 | B1 | 4/2013 | Lewis et al. |
| 10,824,827 | B2 | 11/2020 | Momose |
| 11,055,971 | B1 | 7/2021 | de Castro |

FOREIGN PATENT DOCUMENTS

| CN | 207817887 U | * | 9/2018 |
| DE | 102015002951 B3 | * | 6/2016 |
| JP | 2003044909 A | * | 2/2003 |

OTHER PUBLICATIONS

International Search Report dated May 25, 2023 filed in the corresponding PCT Application; 2 pages.
Written Opinion dated May 25, 2023 filed in the corresponding PCT Application; 12 pages.

\* cited by examiner

*Primary Examiner* — Sonji N Johnson
(74) *Attorney, Agent, or Firm* — Black McCuskey

(57) ABSTRACT

A card reader can include a card insertion slot, a conveyor member, a card-reading head, and a pendulum sensor assembly. The card insertion slot can receive a card from a user. The conveyor member can be configured to move the card along a transport path extending at least partially within the card reader. The card-reading head can be positioned along the transport path, directed toward the transport path. The card-reading head can be configured to read data held on a magnetic strip or held on an embedded chip. The pendulum sensor assembly can include a pendulum and a first sensor. The pendulum can extend into the transport path and can be freely-pivotable about a pivot axis. The first sensor can be configured to detect an angular position of the pendulum about the pivot axis.

12 Claims, 5 Drawing Sheets

CARD READER WITH ENHANCED TAMPER RESISTANCE

CROSS-REFERENCE TO RELATED APPLICATIONS

This application claims the benefit of U.S. Provisional Patent Application Ser. No. 63/309,828 for a CARD READER WITH ENHANCED TAMPER RESISTANCE, filed on 14 Feb. 2022, which is hereby incorporated by reference in its entirety.

BACKGROUND

1. Field

The present disclosure relates to card readers such as, by way of example and not limitation, incorporated in automated transaction machines (ATMs).

2. Description of Related Prior Art

U.S. Pat. No. 11,055,971 discloses a bendable anti-skimming plate for a card reader. The card reader includes a user-card-insertion slot operatively connected to user-card path. A data-reader is located in an interior of the card reader. A plate is located in the interior of the card reader. The plate is adjacent to the data-reader and interior to the user-card-insertion slot. The plate is configured to block the insertion of a skimming or shimming device and to bend during an attempt to remove the plate from the interior of the card reader. The plate may be configured such that a power connection between the plate and a circuit supplying power to the card reader may be broken during an attempt to remove the plate from the interior of the card reader.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A card reader can include a card insertion slot, at least one conveyor member, at least one card-reading head, and a pendulum sensor assembly. The card insertion slot can be configured to receive a card from a user wherein the card can be dispensed to the user through the card insertion slot after a transaction is complete. The at least one conveyor member can be configured to move the card along a transport path extending at least partially within the card reader. The at least one card-reading head can be positioned along the transport path and can be directed toward the transport path. The at least one card-reading head can be configured to read data held on one of a magnetic strip on an underside of the card and held on a chip embedded in the card. The pendulum sensor assembly can include a pendulum and a first sensor. The pendulum can extend into the transport path and can be freely-pivotable about a pivot axis. The first sensor can be configured to detect an angular position of the pendulum about the pivot axis.

According to other features, the pendulum sensor assembly can further include a post extending downwardly from an upper wall of the card reader wherein the pendulum can be mounted on the post for the freely-pivotable movement relative to the post. The at least one conveyor member can include a first conveyor member and a second conveyor member that can be laterally adjacent to the first conveyor member on a same side of the transport path, wherein the pendulum can be positioned between the first conveyor member and the second conveyor member. Alternatively, the second conveyor member can be laterally adjacent to the first conveyor member on opposite sides of the transport path, wherein the pendulum can be positioned between the first conveyor member and the second conveyor member.

In other features, the pendulum can be positioned along the transport path closer to the card insertion slot than to the at least one card-reading head. The card reader can further include a second sensor positioned along the transport path and configured to detect a structure positioned in the transport path in front of the at least one card-reading head. The second sensor and the pendulum can be disposed on opposite sides of the at least one card-reading head along the transport path. The pendulum can be positioned closer to the card insertion slot along the transport path than the second sensor. The pivot axis of the pendulum and the second sensor can be disposed on opposite sides of the transport path.

According to additional features, the card reader can also include a gate assembly positioned along the transport path and configured to selectively open and close the transport path. The card reader can further include a retention bin disposed at an end of the transport path opposite the card insertion slot, wherein the gate assembly can be immediately adjacent to the retention bin along the transport path. The gate assembly can be positioned at a back side of the card reader, the back side of the card reader being an opposite side of card reader relative to the card insertion slot. The gate assembly can further include a shaft, a gate mounted on the shaft, and a motor and sensor assembly configured to drive the shaft in pivoting movement about a central longitudinal axis of the shaft to move the gate between a closed position and an open position.

According to other features, the card reader can further include the second sensor positioned along the transport path and configured to detect a structure in the transport path in front of the at least one card-reading head as well as the gate assembly positioned along the transport path and configured to selectively open and close the transport path. The second sensor can be positioned between the pendulum sensor assembly and the gate assembly along the transport path. The pendulum sensor assembly and the gate assembly can be positioned at opposite ends of the transport path. The gate can be rotatable about a gate axis and the pivot axis of the pendulum and the gate axis can be an opposite side of the transport path relative to the second sensor.

In other features, the at least one conveyor member can further include a plurality of conveyor members. Each of the plurality of conveyor members can respectively define a portion of a boundary of the transport path. The plurality of conveyor members can collectively define a majority of the boundary of the transport path along a first length of the transport path. At least two of the pendulum sensor assembly and the second sensor and the gate assembly can be positioned to detect an object in the first length and a third of the pendulum sensor assembly and the second sensor and the gate assembly can be positioned to detect an object outside of the first length.

An automated transaction machine can include a display, a keypad, an article exchange unit configured dispense notes of currency, and a card reader. The card reader can have a card insertion slot that can be configured to receive a card from a user and the card can be dispensed to the user through the card insertion slot after a transaction is complete. The card reader can also have at least one conveyor member configured to move the card along a transport path extending at least partially within the card reader. The card reader can also have at least one card-reading head positioned along the transport path and directed toward the transport path. The at least one card-reading head can be configured to read data held on one of a magnetic strip on an underside of the card and held on a chip embedded in the card. The card reader can also have a pendulum sensor assembly including a pendulum and a first sensor. The pendulum can extend into the transport path and is freely-pivotable about a pivot axis. The first sensor can be configured to detect an angular position of the pendulum about the pivot axis.

A method of inhibiting placement of a skimming device in a card reader in an automated transaction machine (ATM) can include extending a pendulum of a pendulum sensor assembly into a transport path defined by the card reader wherein the pendulum is freely-pivotable about a pivot axis. The method can also include detecting an angular position of the pendulum about the pivot axis with a first sensor pendulum sensor assembly. The method can also include ceasing, with a computing device having one or more processors, operation of the ATM in response to the angular position equal to a predetermined amount for a predetermined period of time.

BRIEF DESCRIPTION OF THE DRAWINGS

The detailed description set forth below references the following drawings.

DETAILED DESCRIPTION

Figure 1:
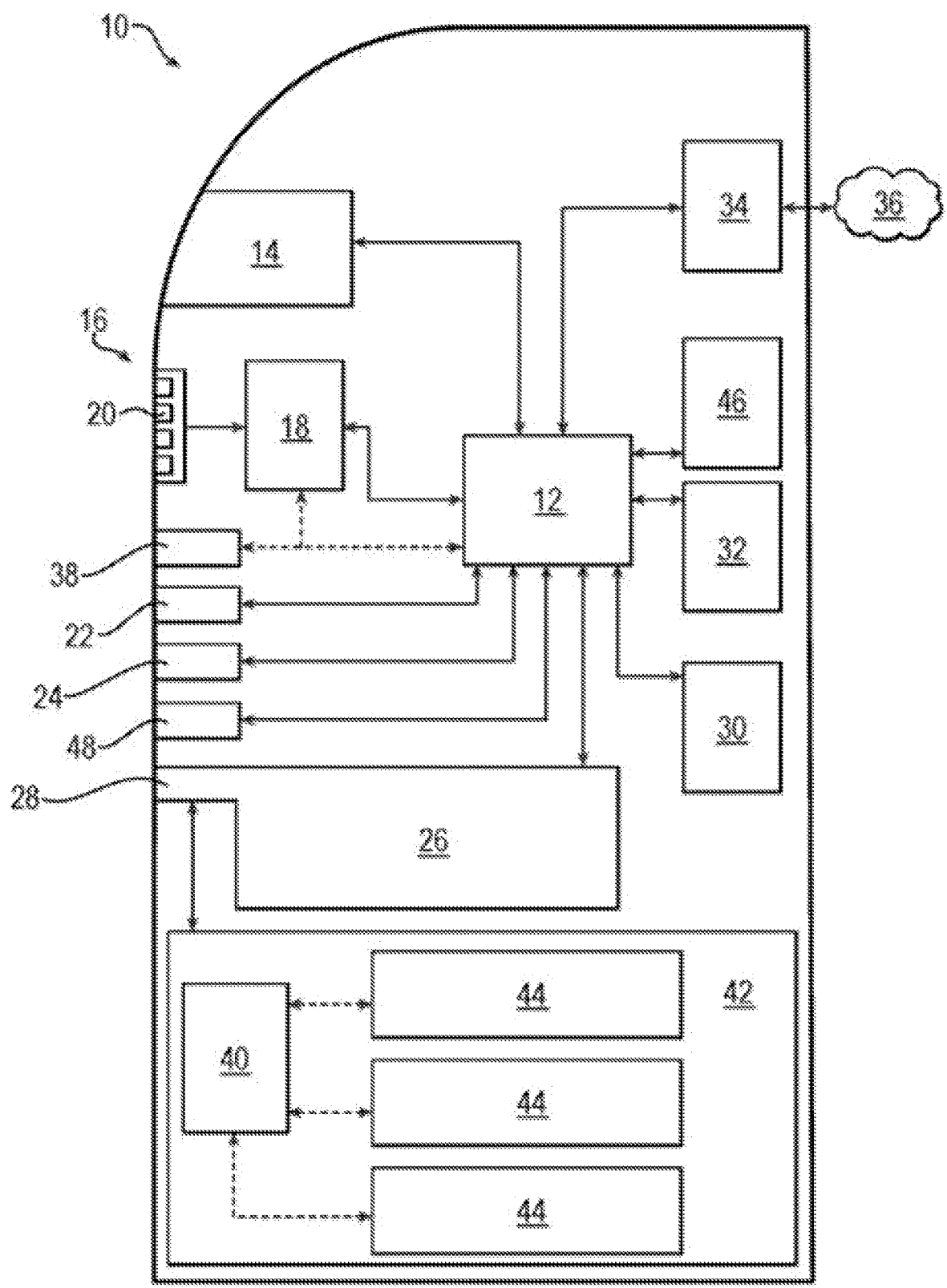
FIG. 1 is a functional block diagram of an exemplary automated transaction machine.

FIG. 1 discloses a functional block diagram of an exemplary ATM 10 according to one or more implementations of the present disclosure. It will be understood that embodiments of the present disclosure are applicable to other types of SSTs, such as vending machines and kiosks, by way of example and not limitation. The ATM 10 includes different structures and subsystems for executing and recording transactions. The ATM 10 includes a computing device 12. The exemplary computing device 12 has one or more processors and a non-transitory, computer readable medium 46. The computing device 12 operates under the control of an operating system, kernel and/or firmware and executes or otherwise relies upon various computer software applications, components, programs, objects, modules, data structures, etc. The exemplary computing device 12 can operate under the control of the Windows® operating system. The computer readable medium (memory) 46 of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere in computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others for memory 46.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted pin pad (EPP). The exemplary key pad 16 includes a plurality of keys, such as key 20. The exemplary encryption module 18 has one or more processors and a non-transitory, computer readable medium. The user can press the keys of the key pad 16 to enter a pin. The key pad 16 is placed in communication with the encryption module 18 and therefore the numbers of the pin are received by the encryption module 18. It is noted that the communication of the pin is direct and secure; the pin cannot be intercepted between the key pad 16 and the encryption module 18. The pin is then encrypted by the encryption module to define a pin block. The encryption module 18 includes a network encryption key and applies the network encryption key to encrypt the pin to a pin block. The exemplary encryption module 18 is configured to transmit the pin block to the computing device 12.

The exemplary ATM 10 also includes a card reader 22. The card reader 22 can receive a token from the user, such as a card. The card reader 22 can be configured to execute read and write operations with respect to any storage medium fixed to the user's card. The exemplary card reader 22 is configured to transmit any data read from the user's card to the computing device 12. The exemplary card reader 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes an article exchange unit 26. In the exemplary embodiment, the article exchange unit 26 is configured to receive and dispense items such as bank notes (cash) and checks. In the art, article exchange units are sometimes referred to as dispensers or cash dispensers or check readers. The exemplary article exchange unit 26 includes a slot 28 defined on an exterior of the ATM 10 for the passage of such items. In other embodiments of the present disclosure, an article exchange unit can be configured to facilitate the exchange of other items, such as receiving notes of currency (cash) or a check, or dispensing cash, or returning a check. The article exchange unit 26 can include one or more sensors and transmit signals from any such sensors to the computing device 12 to execute an exchange. The computing device 12 can control the article exchange unit 26 in response to such signals. For example, the article exchange unit 26 can include a sensor that detects receipt of an item such as a check. The article exchange unit 26 can include a further sensor in the form of a scanner that generates an image of the received item and transmits the image to the computing device 12. When an exchange involves the dispensation of an article to the user, the computing device 12 can control the article exchange unit 26 to dispense the item(s) requested by the user.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized for service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking server communicating with a plurality of ATMs. The exemplary transceiver 34 places the computing device 12 in communication with one or more networks, such as network 36. The network 36 can be a local area network (LAN), a wide area network (WAN) such as the Internet, or any combination thereof. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example. The exemplary computing device 12 is thus configured to communicate with other computing devices.

The exemplary ATM 10 also includes a dispensing device 40. The dispensing device 40 can dispense banknotes, such as currency. The exemplary dispensing device 40 is positioned in a safe 42. One or more cassettes or cash boxes 44 are also positioned and protected in the safe 42. Banknotes are stored in the cassettes 44 for disbursement to a user of the ATM 10. The exemplary dispensing device 40 can extract the banknotes from one or more of the cassettes 44 and direct them out of the ATM 10 through the slot 28. The exemplary dispensing device 40 can be communicate with and be controlled by the computing device 12. Each of the cassettes 44 can engage the dispensing device 40 through a rack whereby the positioning of the cassettes is controlled. Further, the each of the cassettes 44 and the dispensing device 40 can include mating connectors of any form whereby a positive interconnection is confirmed electronically. When one or more of the cassettes 44 and the dispensing device 40 are not properly interconnected, a signal or lack thereof can be communicated to the computing device 12 whereby an error message is generated or the ATM 10 can be disabled.

The exemplary ATM 10 also includes a scanner 48. The scanner 48 can scan, for example, at least a portion of a display of a smart phone and communicate the scanned display to the computing device 12. A token can be displayed on the display of the smart phone and thus scanned by the scanner 48. The token can be a bar code, a quick response (QR) code, a number, a string of alphanumeric characters, a weblink, or some other symbolic indicia. The exemplary scanner 48 is configured to transmit any scanned data to the computing device 12, which can direct the scanned away from the ATM 10 during completion of a financial transaction.

Figure 2:
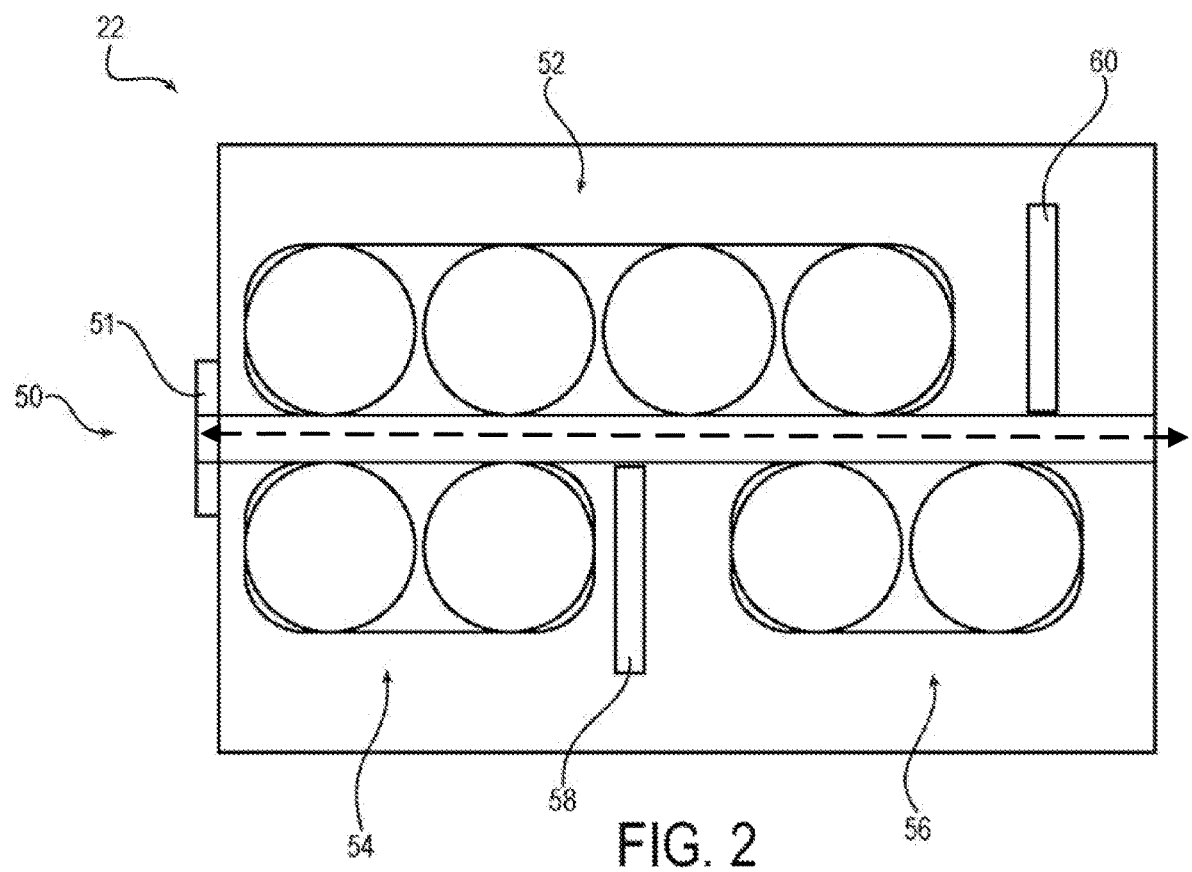
FIG. 2 is a schematic diagram of an embodiment of an exemplary card reader.

FIG. 2 is a schematic diagram of the exemplary card reader 22. The card reader 22 is exemplary and shown schematically and, as such, embodiments of the present disclosure can be practiced with card readers configured differently. The exemplary card reader 22 includes a user-card-insertion slot 51 exposed on the front face of the ATM 10. The user can insert a card in the user-card-insertion slot 51. The card reader 22 defines a transport path (i.e., a path of movement of the card) referenced by spaced, dash lines at 50. The exemplary transport path 50 is formed in part by space in the interior of the card reader 22. The exemplary card reader 22 also includes a plurality of conveyor members 52, 54, and 56 configured to move the card along transport path 50. Conveyor members 54 and 56 are adjacent to one another longitudinally along the transport path 50a. Conveyor members 52 and 54 are adjacent to one another laterally on opposite sides of the transport path 50a. Conveyor members 52, 54, and 56 may be motorized, and may be configured to selectively convey a user card in the forward (such as toward a back side of the ATM) or backward direction (such as toward the front face of the ATM). For example, one or more of conveyor members 52, 54, and 56 can include wheels or rollers, belts driven in rotation by wheels, cams, vanes, and any other structure or assembly that can induce rectilinear movement, and such structure or assembly can include appropriate surface texture to grip and move the card. The space within the card reader that is utilized as the transport path 50 can be delimited or defined by surfaces of the conveyor members 52, 54, and 56 as well as surfaces defined by other structures within the card reader 22.

An exemplary card reader 22 also includes data readers, such as card-reading heads 58 and 60. Card-reading head 58 is positioned along transport path 50 and configured to read data held on a magnetic strip on an underside of a user card. Card-reading head 60 is positioned along transport path 50 and is configured to read data held on a chip embedded in a user card.

An exemplary card reader 22, in conjunction with card-reading head 58 and/or card-reading head 60, is operative to read data bearing records presented by machine users. The records can include data corresponding to at least one of the owner of the card, one or more user financial accounts of the owner of the card, and/or other data. In some exemplary embodiments, exemplary card reader 22 can read the data from magnetic strip cards and cards having chips. In other exemplary embodiments, exemplary card reader 22 can be operative to read data from other card or record types such as contactless cards. Of course, these approaches are exemplary.

Figure 3:
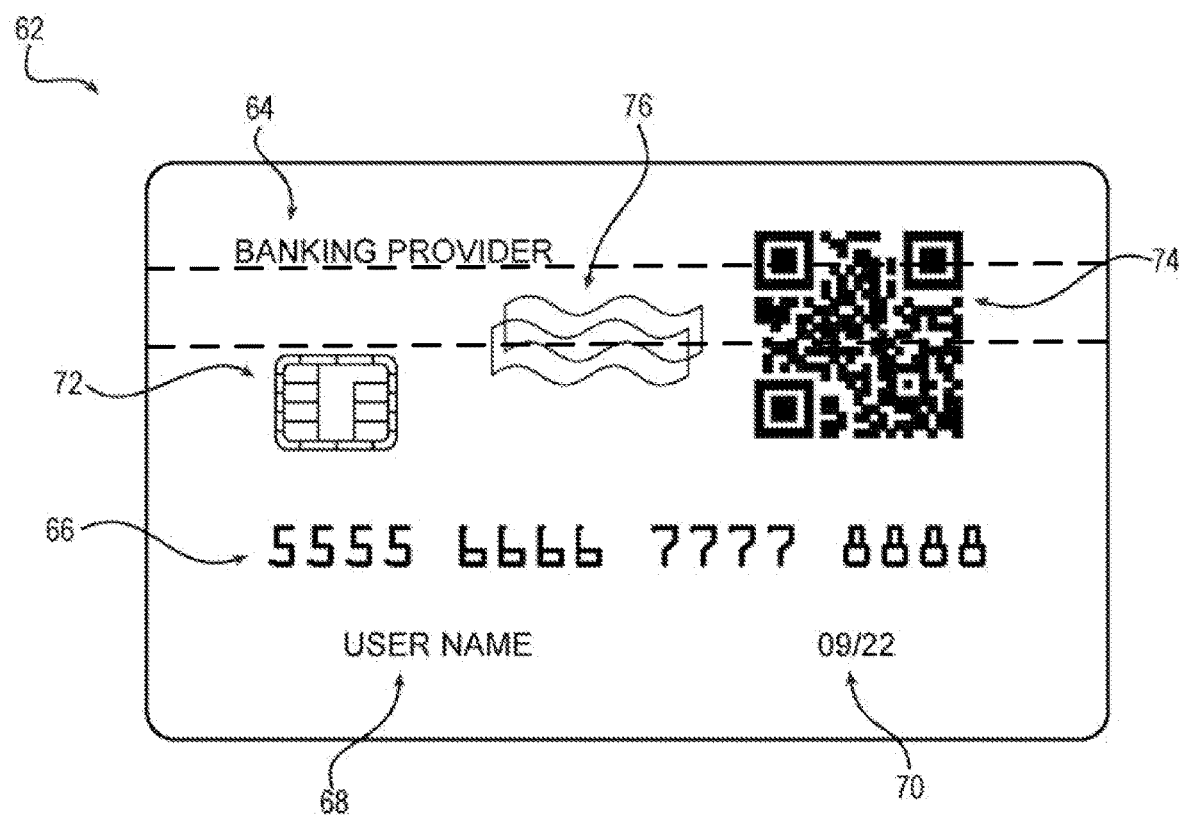
FIG. 3 is a front view of an exemplary user card.

FIG. 3 is a front view of an exemplary user card 62. The exemplary user card 62 displays various indicia. Indicia 64 is the name of the issuer of the card. Indicia 66 is an account number. Indicia 68 is the card holder's name. Indicia 70 is the date of expiration of the user card. The exemplary user card 62 also includes an integrated circuit or chip 72, storing information. The exemplary user card 62 also includes indicia 74 in the form a QR code. The exemplary user card 62 also includes a magnetic strip on the back, the edges of the strip are shown in dash lines in FIG. 3. The exemplary user card 62 also includes a holographic indicia 76. In other exemplary embodiments, user card 62 may include more or less indicia then set forth above. The magnetic strip and the chip 72 are arranged on the card 62 and the reading heads 58, 60 are arranged on the path 50 so that the magnetic strip and the chip 72 pass across at least one of the reading heads 58, 60 so that the reading heads 58, 60 can read the data contained on the magnetic strip and the chip 72.

Figure 4:
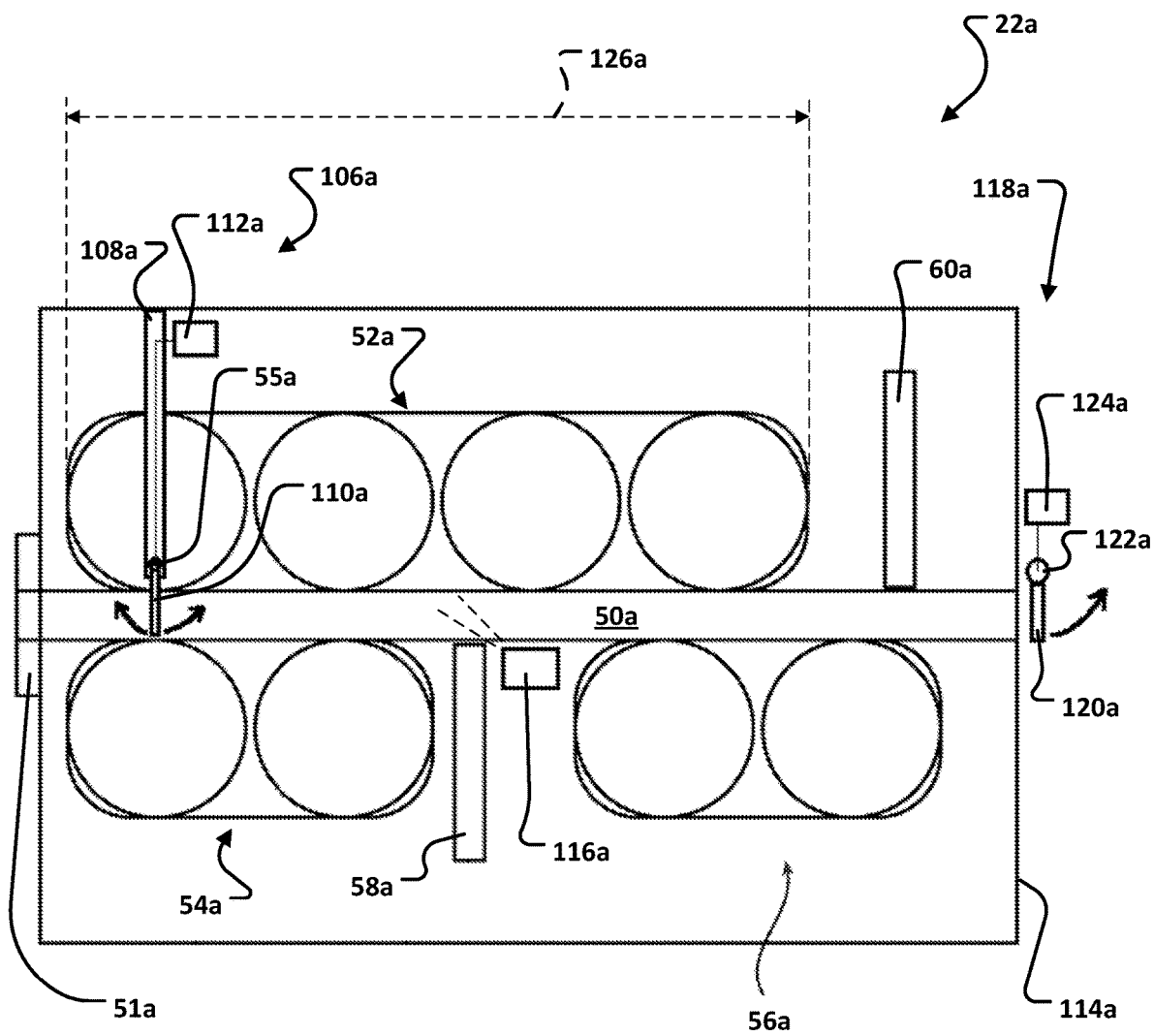
FIG. 4 is a schematic diagram of an embodiment of an exemplary card reader with enhanced tamper resistance from the side.
Figure 5:
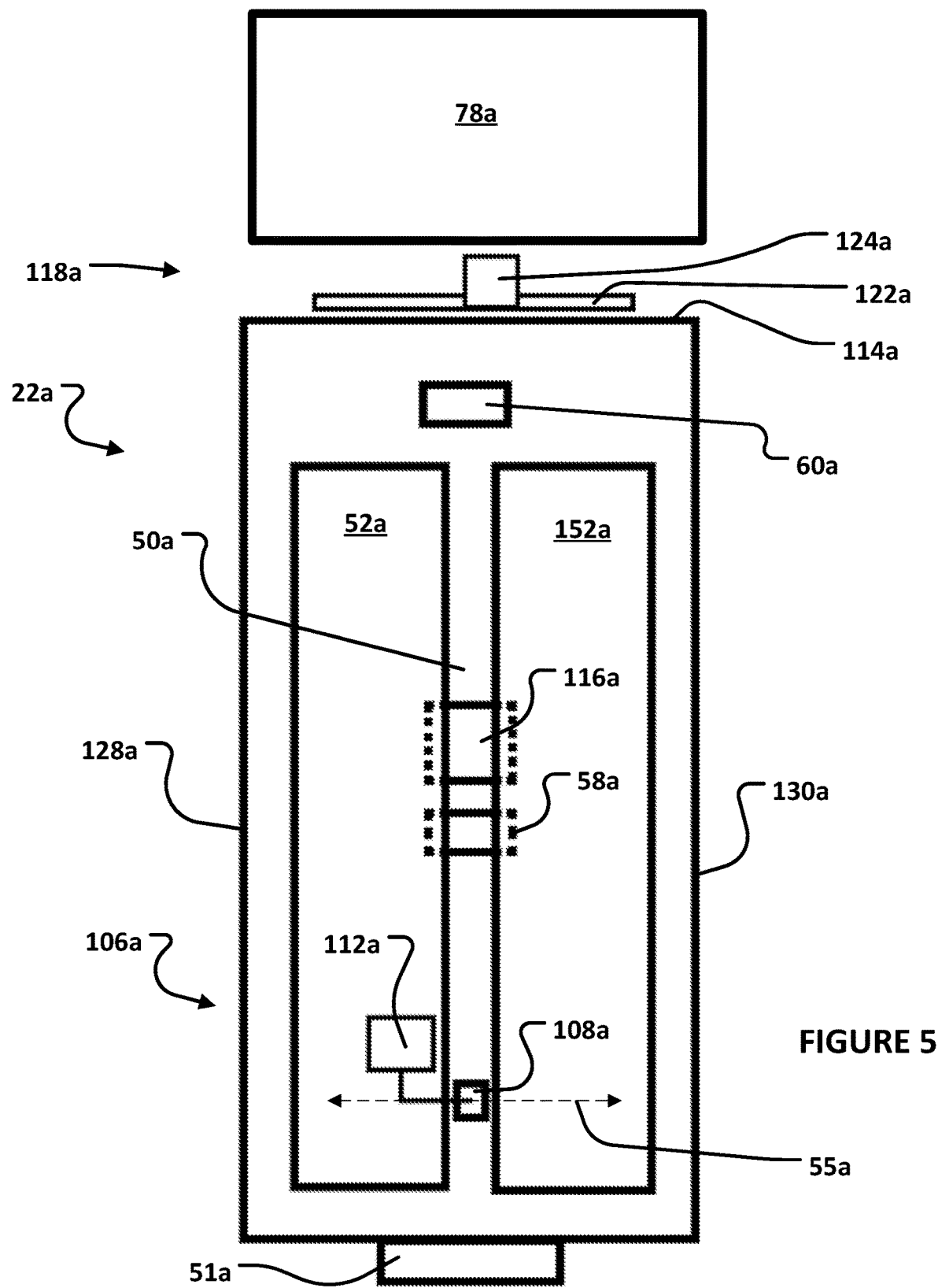
FIG. 5 is a schematic diagram of the embodiment of the exemplary card reader with enhanced tamper resistance from the top.

FIG. 4 is a schematic diagram of an embodiment of an exemplary card reader 22a with enhanced tamper resistance from the side of the card reader 22a and FIG. 5 is a schematic diagram from the top of the card reader 22a. The exemplary card reader 22a includes conveyor members 52a, 152a, 54a, 56a. Conveyor members 52a and 152a are adjacent to one another laterally on the same side of the transport path 50a. The exemplary card reader 22a defines a transport path 50a along which a card is moved during a financial transaction. The exemplary card reader 22a also includes a plurality of features that enhance tamper resistance by acting as countermeasures to prevent the positioning of a skimming device within the card transport path 50a. It is noted that card readers according to the present disclosure need not include all of the features disclosed below that enhance tamper resistance.

The exemplary card reader 22a includes a first feature enhancing tamper resistance in the form of a pendulum sensor assembly 106a. The pendulum sensory assembly 106a includes post 108a, a pendulum 110a, and a sensor 112a. The post 108a extends downwardly from an upper wall of the card reader 22a. The pendulum 110a is mounted on the post 108a for freely-pivoting movement relative to the post 108a about a pivot axis 55a. The exemplary pendulum 110a is uninhibited in movement about the pivot axis 55a when acted upon laterally by a structure moving along the transport path 50a. As shown in FIG. 4, the exemplary pendulum 110a is positioned along the transport path 50a closer to the card insertion slot 51a than to any of the card-reading heads 58a, 60a. The exemplary pendulum 110a can pivot toward a back 114a of the card reader 22a when the card 62 is received and can pivot forward toward a card insertion slot 51a at the front face of the ATM when the card 62 is output. In the exemplary embodiment, only the weight of the exemplary pendulum inhibits movement of the card along the path 50a and this is minimal. The exemplary pendulum 110a does not impede movement of the card 62 in either direction. The exemplary pendulum 110a is positioned between the conveyor member 52a and the conveyor member 152a, which are laterally adjacent to one another on the same side of the transport path 50a, and is positioned between the conveyor member 52a and the conveyor member 54a, which are laterally adjacent to one another on opposite sides of the transport path 50a.

The exemplary sensor 112a is configured to detect the angular position of the exemplary pendulum 110a relative to the post 108a. The angular position can also be defined relative to one or more positions of the pendulum 110a about the pivot axis 55a. For example, a reference position can be defined when the pendulum 110a is directed downward, at a "six o'clock" position. The exemplary sensor 112a transmits signals corresponding to the conditions sensed by the exemplary sensor 112a to the computing device 12. When no structure is in the transport path 50a along which the card 62 travels, the exemplary pendulum 110a is aligned with the exemplary post 108a, extending directly downward, at the six o'clock position, as shown in FIG. 4. When the card 62 is moving along the transport path 50a toward the back 114a, the pendulum 110a can be moved counter-clockwise (based on the orientation shown in FIG. 4) toward the three o'clock position. When the card 62 is moving along the transport path 50a away from the back 114a, the pendulum 110a can be moved clockwise (based on the orientation shown in FIG. 4) toward the nine o'clock position.

In operation, if a skimming device is directed into the card reader 22a and positioned in the path 50a traveled by the card 62, the pendulum 110a will not extend directly downward. The pendulum 110a will remain in a particular angular position indefinitely, for as long as the skimmer is in place. The exemplary computing device 12 can operate programmed logic such that when the exemplary computing device 12 detects, through signals received from the exemplary sensor 112a, that the pendulum 110a is not extending directly downward from a predetermined period of time, the computing device 12 can cease operations of the ATM 10 and alert service personnel. The predetermined period of time can be five seconds, or ten seconds, or thirty seconds, or any other period of time consistent with the operation of the ATM 10.

Another benefit of the exemplary pendulum sensory assembly 106a is that the pendulum 110a can inhibit removal of a skimming device. Specifically, if removal is attempted, a distal end of the exemplary pendulum 110a can catch on a structural feature of the skimmer such as, by way of example and not limitation, a card-reading head, a latch intended to fix the skimmer to the internal workings of the card reader 22a, a battery, a frame, or a processor. This would preclude a party from obtaining a processor of the skimming device which might contain data gathered by the skimming device.

The exemplary card reader 22a also includes a second feature enhancing tamper resistance in the form of a sensor 116a. The exemplary sensor 116a and the exemplary pendulum sensory assembly 106a are disposed on opposite sides of the card-reading head 58a along the transport path 50a. The exemplary pendulum 110a is positioned closer to the exemplary card insertion slot 51a along the transport path 50a than the sensor 116a. The exemplary pivot axis 55a of the exemplary pendulum 110a and the exemplary sensor 116a are disposed on opposite sides of the exemplary transport path 55a. The exemplary sensor 116a is positioned along the transport path 50a and is configured to detect a structure in the path 50a. As shown in FIGS. 4 and 5, the exemplary pendulum sensor assembly 106a and the exemplary gate assembly 118a are positioned at opposite ends of the exemplary transport path 50a.

The exemplary sensor 116a can be configured as a proximity sensor and be positioned/directed to sense or monitor the position of the path 50a that is in front of the card-reading head 58a. Two dash lines are shown in FIG. 4 and schematically represent a spatial field of detection of the exemplary sensor 116a. The exemplary sensor 116a can thus detect a card-reading head on a skimming device. The exemplary sensor 116a transmits signals corresponding to the conditions sensed by the exemplary sensor 116a to the computing device 12. Although not shown, the exemplary card reader 22a can also include a second sensor similar to exemplary sensor 116a but positioned adjacent to a card-reading head 60a and configured/directed to sense the position of the path 50a that is above the card-reading head 60a.

In operation, if a skimming devices is directed into the card reader 22a and positioned in the path traveled by the card 62, the sensor 116a will sense the presence of the card-reading head 98. The exemplary computing device 12 can operate programmed logic such that when the exemplary computing device 12 detects, through signals received from the exemplary sensor 116a, the presence of something in front of the card-reading head 58a for a predetermined period of time, the computing device 12 can cease operations of the ATM 10 and alert service personnel. The predetermined period of time can be five seconds, or ten seconds, or thirty seconds, or any other period of time consistent with the operation of the ATM 10.

The exemplary card reader 22a also includes a third feature enhancing tamper resistance in the form of a gate assembly 118a. The exemplary gate assembly 118a includes a gate 120a, a shaft 122a, and a motor and sensor assembly 124a. The motor of the assembly 124a can be an electric motor and the sensor can be a rotary sensor like the sensor 102. The exemplary gate 120a is mounted on the exemplary shaft 122a. The exemplary shaft 122a can be supported on another, fixed structure of the exemplary card reader 22a for rotating/pivoting movement. The exemplary motor and sensor assembly 124a drives the exemplary shaft 122a in pivoting movement about the central longitudinal axis of the shaft 122a to move the gate 120a between a closed position (shown in FIG. 4) and an open position. The central longitudinal axis of the shaft 122a is the axis of rotation (or "gate axis") of the exemplary gate 120a. The gate axis and the pivot axis 55a are on a side of the transport path 50a that is opposite to the side of the transport path 50a on which the second sensor 116a is disposed. Thus, the present disclosure provides counter-measures to skimming devices that are disposed on opposite sides of the transport path 50a and, also, are disposed at multiple positons along the length of the transport path 50a.

When the gate 120a is the open position, the card 62 can be moved completely through the card reader 22a, to be received in a retention bin 78a. The exemplary retention bin 78a can define a portion and an end of the transport path 50a that is opposite to the end defined by the exemplary card insertion slot 51a. The exemplary gate assembly 118a is immediately adjacent to the retention bin 78a along the transport path 50a. Depositing the card 62 in the retention bin 78a can occur if the card 62 is not taken back by the user of the ATM 10 or if the card 62 must be kept for some other reason such as if the card 62 had been reported stolen or lost.

In operation, if a skimming device is directed into the card reader 22a, the gate 120a can prevent a latch of skimming device from engaging the back portion 114a of the card reader 22a and thereby prevent the skimming device from maintaining a particular position along the path 50a. Particular positioning is generally necessary for the card-reading heads of the skimming device to align with card-reading heads of the card reader 22a. Further, the gate 120a can prevent the skimming device from being fully received within the card reader 22a such that a portion of the skimming device may protrude out of the slot 51. If a portion of the skimming device protrudes out of the card-insertion slot 51, a user can more easily detect that the ATM 10 may have been tampered with and avoid using the ATM 10. Further, if a skimming device is somehow inserted when the gate 120a is open, the shaft 122a will be precluded from rotating fully to close the gate 120a and the sensor of the assembly 124a can emit signal to the computing device 12 alerting the computing device 12 of this condition. In response to receiving this signal, the computing device 12 can cease operations of the ATM 10 and/or send an alert to maintenance personnel over the network 36.

Each of the plurality of conveyor members 52a, 54a, 56a, 152a respectively defines a portion of a boundary of the transport path 50a. For example, the exemplary conveyor members 52a, 152a each define part of an "upper" boundary of the transport path 50a based on the orientation of the views of FIGS. 4 and 5. Similarly, the exemplary conveyor members 54a, 56a each define part of a "lower" boundary of the transport path 50a based on the orientation of the views of FIGS. 4 and 5. In the exemplary embodiment, the plurality of conveyor members 52a, 54a, 56a, 152a collectively define a majority of the boundary of the transport path 50a along a first length 126a of the transport path 50a. In the exemplary embodiment, "side" boundaries of the transport path 50a can be defined by walls 128a, 130a of the card reader 22a. As shown in FIGS. 4 and 5, the pendulum sensor assembly 106a and the sensor 116a are positioned to detect an object that would be in the first length 126a. The exemplary gate assembly 118a is positioned to detect an object that would be outside of the first length 126a.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to a particular embodiment disclosed herein as the best mode contemplated for carrying out this present disclosure, but that the present disclosure will be viewed as covering any embodiment falling within the scope of the appended claims. Also, the right to claim a particular sub-feature, sub-component, or sub-element of any disclosed embodiment, singularly or in one or more sub-combinations with any other sub-feature(s), sub-component(s), or sub-element(s), is hereby unconditionally reserved by the Applicant. Also, particular sub-feature(s), sub-component(s), and sub-element(s) of one embodiment that is disclosed herein can replace particular sub-features, sub-components, and sub-elements in another embodiment disclosed herein or can supplement and be added to other embodiments unless otherwise indicated by the drawings or this specification. For example, the Applicant reserves the right to claim any one of the disclosed pendulum and proximity sensors and the gate assembly singly and not in combination. Further, the use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; and wherein said pendulum sensor assembly further comprises: a post extending downwardly from an upper wall of the card reader, said pendulum mounted on said post for the freely-pivotable movement relative to said post.

2. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; and wherein said at least one conveyor member further comprises: a first conveyor member; and a second conveyor member laterally adjacent to said first conveyor member on a same side of said transport path, wherein said pendulum is positioned between said first conveyor member and said second conveyor member.

3. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; and wherein said at least one conveyor member further comprises: a first conveyor member; and a second conveyor member laterally adjacent to said first conveyor member on opposite sides of said transport path, wherein said pendulum is positioned between said first conveyor member and said second conveyor member.

4. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; and wherein said pendulum is positioned along said transport path closer to said card insertion slot than to said at least one card-reading head.

5. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; a second sensor positioned along said transport path and configured to detect a structure positioned in said transport path in front of said at least one card-reading head; and wherein said second sensor and said pendulum are disposed on opposite sides of said at least one card-reading head along said transport path.

6. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; a second sensor positioned along said transport path and configured to detect a structure positioned in said transport path in front of said at least one card-reading head; and a second sensor positioned along said transport path and configured to detect a structure positioned in said transport path in front of said at least one card-reading head; and wherein said pendulum is positioned closer to said card insertion slot along said transport path than said second sensor.

7. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; a second sensor positioned along said transport path and configured to detect a structure positioned in said transport path in front of said at least one card-reading head; and wherein said pivot axis of said pendulum and said second sensor are disposed on opposite sides of said transport path.

8. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; a second sensor positioned along said transport path and configured to detect a structure in said transport path in front of said at least one card-reading head; a gate assembly positioned along said transport path and configured to selectively open and close said transport path; and wherein said second sensor is positioned between said pendulum sensor assembly and said gate assembly along said transport path.

9. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; a second sensor positioned along said transport path and configured to detect a structure in said transport path in front of said at least one card-reading head; a gate assembly positioned along said transport path and configured to selectively open and close said transport path; and wherein said pendulum sensor assembly and said gate assembly are positioned at opposite ends of said transport path.

10. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; a second sensor positioned along said transport path and configured to detect a structure in said transport path in front of said at least one card-reading head; a gate assembly positioned along said transport path and configured to selectively open and close said transport path; and wherein said gate is rotatable about a gate axis and wherein said pivot axis of said pendulum and said gate axis are an opposite side of said transport path relative to said second sensor.

11. A card reader comprising: a card insertion slot configured to receive a card from a user and wherein the card is dispensed to the user through said card insertion slot after a transaction is complete; at least one conveyor member configured to move the card along a transport path extending at least partially within said card reader; at least one card-reading head positioned along said transport path and directed toward said transport path, said at least one card-reading head configured to read data held on one of a magnetic strip on an underside of the card and held on a chip embedded in the card; a pendulum sensor assembly including a pendulum and a first sensor, said pendulum extending into said transport path and is freely-pivotable about a pivot axis, said first sensor configured to detect an angular position of said pendulum about said pivot axis; a second sensor positioned along said transport path and configured to detect a structure in said transport path in front of said at least one card-reading head; a gate assembly positioned along said transport path and configured to selectively open and close said transport path; and wherein said at least one conveyor member further comprises a plurality of conveyor members, wherein each of said plurality of conveyor members respectively defines a portion of a boundary of said transport path, wherein said plurality of conveyor members collectively define a majority of said boundary of said transport path along a first length of said transport path, and wherein at least two of said pendulum sensor assembly and said second sensor and said gate assembly are positioned to detect an object in said first length and a third of said pendulum sensor assembly and said second sensor and said gate assembly is positioned to detect an object outside of said first length.

12. A method of inhibiting placement of a skimming device in a card reader in an automated transaction machine (ATM) comprising: extending a pendulum of a pendulum sensor assembly into a transport path defined by the card reader wherein the pendulum is freely-pivotable about a pivot axis; detecting an angular position of the pendulum about the pivot axis with a first sensor pendulum sensor assembly; and ceasing, with a computing device having one or more processors, operation of the ATM in response to the angular position equal to a predetermined amount for a predetermined period of time.

* * * * *

UNITED STATES PATENT AND TRADEMARK OFFICE
CERTIFICATE OF CORRECTION

PATENT NO. : 12,056,557 B2
APPLICATION NO. : 18/098750
DATED : August 6, 2024
INVENTOR(S) : Kelley et al.

Page 1 of 1

It is certified that error appears in the above-identified patent and that said Letters Patent is hereby corrected as shown below:

In the Claims

Claim 6, Column 12, starting at Line 56, delete "and a second sensor positioned along said transport path and configured to detect a structure positioned in said transport path in front of said at least one card-reading head;"

Signed and Sealed this
Twenty-fifth Day of March, 2025

Coke Morgan Stewart
*Acting Director of the United States Patent and Trademark Office*